United States Patent

Redder et al.

Patent Number: 5,161,850
Date of Patent: Nov. 10, 1992

[54] SLIDING VISOR

[75] Inventors: Douglas J. Redder, Zeeland; Stephen W. Grant, Holland, both of Mich.

[73] Assignee: Prince Corporation, Holland, Mich.

[21] Appl. No.: 757,258

[22] Filed: Sep. 10, 1991

[51] Int. Cl.$^5$ .............................................. B60T 3/02
[52] U.S. Cl. .................................................. 296/97.11
[58] Field of Search ................ 296/97.11, 97.8, 97.13, 296/97.1

[56] References Cited

U.S. PATENT DOCUMENTS

| | | | |
|---|---|---|---|
| 2,194,317 | 8/1942 | Pelcher et al. | 296/97.11 |
| 2,207,668 | 7/1940 | Hudgings, Jr. | 296/97.11 |
| 2,260,482 | 10/1941 | Roberts | 296/97.13 |
| 2,322,898 | 6/1943 | Van Dresser | 296/97.11 |
| 2,921,813 | 1/1960 | Lowry | 296/97.11 |
| 3,032,371 | 5/1962 | Berridge et al. | 296/97.11 |
| 3,865,428 | 2/1975 | Chester | 296/97.11 |
| 4,521,046 | 6/1985 | Foggini | 296/97.13 |
| 4,582,356 | 4/1986 | Kaiser et al. | 296/97.11 |
| 4,762,359 | 8/1988 | Boerema et al. | 296/97.11 |
| 4,902,063 | 2/1990 | Crink | 296/97.11 |
| 4,921,300 | 5/1990 | Lawassani et al. | 296/97.11 |
| 4,925,232 | 5/1990 | Hemmeke et al. | 296/97.8 |
| 4,925,233 | 5/1990 | Clark | 296/97.11 |
| 4,998,765 | 3/1991 | Van Order et al. | 296/97.11 |
| 5,004,288 | 4/1991 | Viertel et al. | 296/97.11 |
| 5,007,532 | 4/1991 | Binish | 296/97.1 |
| 5,026,108 | 6/1991 | Leahy | 296/97.11 |

FOREIGN PATENT DOCUMENTS 3235997 3/1984 Fed. Rep. of Germany.
3324305 1/1985 Fed. Rep. of Germany.

*Primary Examiner*—Robert R. Song
*Attorney, Agent, or Firm*—Price, Heneveld, Cooper, DeWitt & Litton

[57] ABSTRACT

A sliding visor includes a visor body and slide assembly which includes a slide bar which slideably extends within the visor body. The slide bar includes an outwardly extending tab which extends within a guide mounted to the visor body for limiting the longitudinal motion of the visor body along the slide bar. In a preferred embodiment of the invention, the visor core includes a resilient frictional engagement member which compressively engages the visor slide for providing friction and anti-rattle control for the visor in its movement with respect to the slide bar.

20 Claims, 2 Drawing Sheets

SLIDING VISOR

BACKGROUND OF THE INVENTION

The present invention pertains to a visor and particularly to a sliding visor construction. In multiple visor installations of the type, for example, disclosed in U.S. Pat. No. 4,762,359, it is desirable to provide at least one visor which can slide along a support member to provide effective sun blocking protection for different areas of the windshield. In the above identified patent, the sliding visor is made of a polymeric material including integral mounting bosses surrounding a solid pivot rod. Other sliding visor constructions have also been suggested as for example in U.S. Pat. Nos. 3,865,428; 4,521,046; 4,925,233; and 4,998,765.

SUMMARY OF THE PRESENT INVENTION

The sliding visor construction of the present invention provides an improved and alternative construction over the prior art by providing a slide assembly which includes a slide bar guide within a visor core for controlling the sliding movement of the visor on the pivot slide. In a preferred embodiment also, the visor includes an anti-rattle friction control to provide a predetermined sliding resistance for holding the visor in an adjusted position and allowing controlled movement of the visor with a predetermined force.

Visors embodying the present invention include a visor body and slide assembly which includes a slide bar which slideably extends within the visor body. The slide bar includes an outwardly extending tab which extends within guide means of the visor body for limiting the longitudinal adjustment motion of the visor body along the slide bar which can be pivotally mounted to a vehicle. In a preferred embodiment of the invention, the slide bar is a generally thin rectangular member in cross section and the visor includes a core with a resilient frictional engagement member which compressively engages the visor slide for providing friction and anti-rattle control of the visor in its movement with respect to the slide bar.

These and other features, objects and advantages of the present invention will become apparent upon reading the following description thereof together with reference to the accompanying drawings in which:

DETAILED DESCRIPTION OF THE PREFERRED EMBODIMENT

Figure 1:
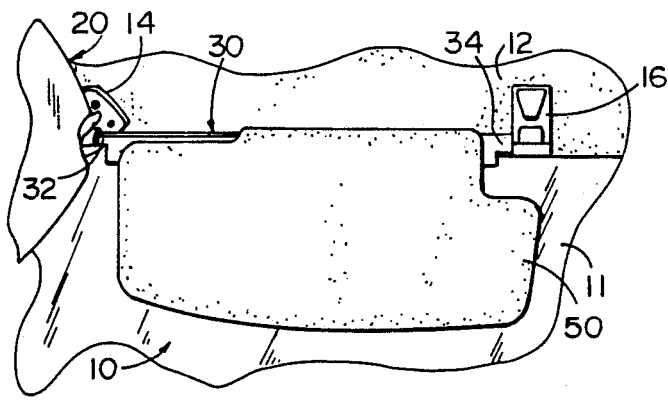
FIG. 1 is a perspective view of a visor embodying the present invention shown in a first use position.
Figure 2:
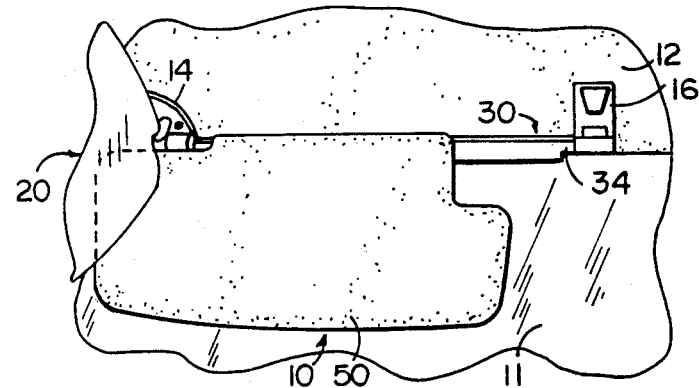
FIG. 2 is a perspective view of a visor embodying the present invention shown in a second use position.

Referring initially to FIGS. 1 and 2, there is shown a visor 10 which is mounted above the windshield 11 of a vehicle having a roof 12 for receiving a first mounting bracket 14 and second mounting bracket 16. Brackets 14 and 16 accommodate the first visor 10 and a second visor 20 which can pivot about bracket 14 between a front window position or a side window position as illustrated in FIGS. 1 and 2. Brackets 14 and 16 are of the type described in greater detail in U.S. Pat. No. 4,925,232, the disclosure of which is incorporated herein by reference.

Visor 10 is mounted between brackets 14 and 16 and for such purpose an elongated visor slide 30 is employed and which is made of a polymeric material such as polycarbonate. Visor slide 30 has a main body of generally triangular cross-sectional shape (FIG. 4A) and a tab 35 extending laterally therefrom. Slide 30 has an average thickness significantly less than its height as best seen by comparing FIG. 3 and FIG. 4A. Slide bar 30 has integral narrowed generally rounded ends 32 and 34 with flats which fit within the sockets formed in brackets 14 and 16 respectively to provide a predetermined rotational torque of the bar 30 with respect to brackets 14 and 16 for movement between a lowered use position as illustrated in FIGS. 1 and 2 to an upwardly pivoted stored position against roof 12 as described in greater detail in the above-identified '232 patent In the multiple visor installation shown in FIGS. 1 and 2, visor 10 is raised to such a stored position prior to movement of visor 20 to a stored position. The visor 10 is sandwiched between the roof 12 and visor 20 when both visors are in a stored position.

Figure 3:
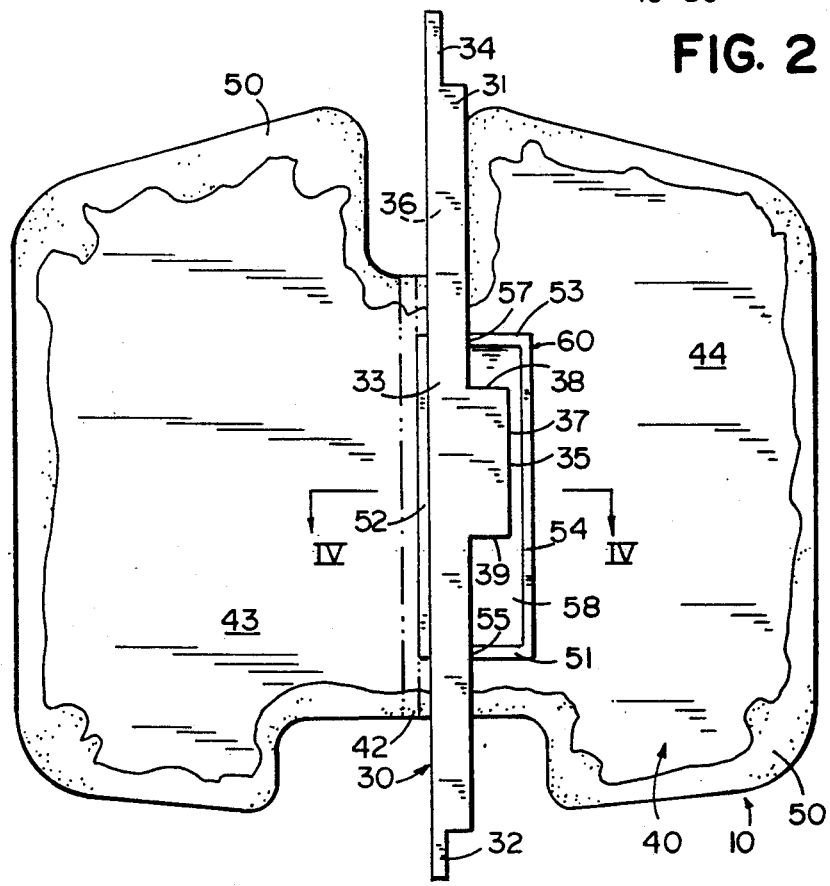
FIG. 3 is an enlarged front elevational view of a visor opened to expose the slide assembly of the present invention.

The detailed construction of one embodiment of visor 10 is shown in FIGS. 3 and FIG. 4A in which the visor includes a folded butterfly-type visor core 40 made of a fiberboard material which is cut in a generally butterfly shape with halves 43 and 44 which are folded along a centerline 42 over the visor slide bar 30. This core construction, together with the upholstery 50 covering the outer decorative surface of visor 10, is described in greater detail in U.S. Pat. No. 5,007,532, issued on Apr. 16, 1991 to Prince Corporation; the disclosure of which is incorporated herein by reference. Mounted within visor core 40 by means of a suitable adhesive is a guide 50 comprising, in the embodiment shown in FIG. 3, a generally rectangular frame member of a polymeric material such as polycarbonate. Guide 50 has an upper thin rectangular wall 52 positioned immediately adjacent fold line 42 of core 40, a lower thin rectangular wall 54 spaced in parallel relationship to wall 52 and side walls 51 and 53. Walls 51 and 53 each include notches 55 and 57 respectively near wall 52 each having a width and depth sufficient to receive the ends of slide 30 and to allow the visor slide 30 to move in a confined and controlled manner within guide 50.

Slide 30 integrally includes an elongated main portion, which in cross section is generally triangular, and a laterally extending rectangular tab 35 which fits within the open space 58 within guide 50 and between sides 43 and 44 of core 40 when the visor is assembled as seen in FIGS. 1 and 2. Tab 35 has a right edge 38 which engages wall 53 of guide 50 when visor 10 is moved to its rightmost position illustrated in FIG. 1 and a left edge 39 which engages wall 51 when visor 10 is moved to its rightmost position as illustrated in FIG. 2. Tab 35 is inclined with respect to the plane of the elongated main body of the slide 30 and provides a tip 37 which engages wall 44 of core 40 for providing frictional engagement force between slide 30 and visor core 40 when enclosed. Thus, slide 30 and its tab 35 are captively but slideably held within the framework defined by guide 50 to allow guided and limited sliding movement of the visor on slide 30. The apertures 55 and 57 together with the polymeric materials of parts 30 and 50 respectively, provide a lubricious interface between slide 30 and the visor body including guide 50 to provide controlled sliding of the visor. The folding of fiberboard core member 40 over the relatively flat front and rear surfaces 31 and 33 respectively of slide 30 tends to provide additional stability to the visor and slide interface 30 in its movement within guide 50. In some applications, a more controlled frictional engagement is desired and for such purpose the visor construction shown in the alternative embodiment of FIGS. 1, 2, 4, and 5 is provided which is now described.

Figure 4:
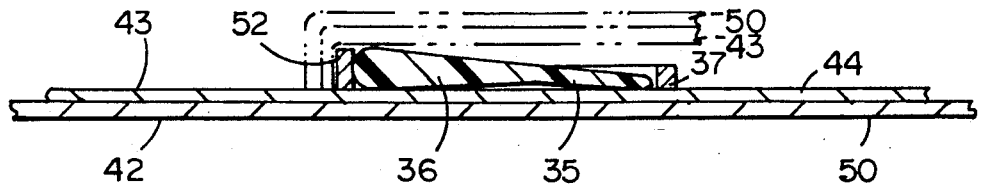
FIG. 4 is a fragmentary cross-sectional view taken along the section line IV—IV of FIG. 3.
Figure 6:
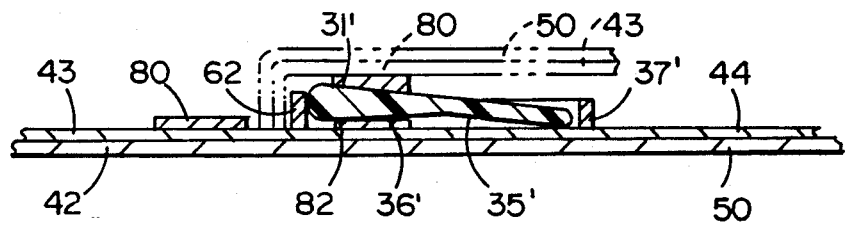
FIG. 6 is a fragmentary cross-sectional view of the slide construction shown in FIG. 4 taken along section line VI—VI of FIG. 5.

The visor 10' shown in FIG. 4 has a core construction 40 identical to core 40 of visor 10 shown in FIG. 3. Visor slide 30' of FIG. 4 has a main portion which is somewhat triangular in cross-section (FIG. 6B) and includes a tab 35' which are seen in FIG. 4 includes inwardly beveled edges 38 and 39 which conform to beveled corners 68 and 69 of guide 60. Guide 60 includes an upper wall 62 defining a top support edge for the upper edge 33' of slide 30', substantially thin walled legs 61 and 63 extending downwardly from opposite ends of wall 62 and underlying the rear surface 36' (FIG. 6B) of slide 30'; and a lower section defined by downwardly depending legs 65 and 67 which join beveled legs 68 and 69 and terminate in a lower leg 70 joining the inner ends of legs 68 and 69 as shown in FIG. 4. Guide 60 is integrally molded of a polymeric material such as polycarbonate and secured to core 40 adjacent fold line 42 using a suitable adhesive.

Figure 5:
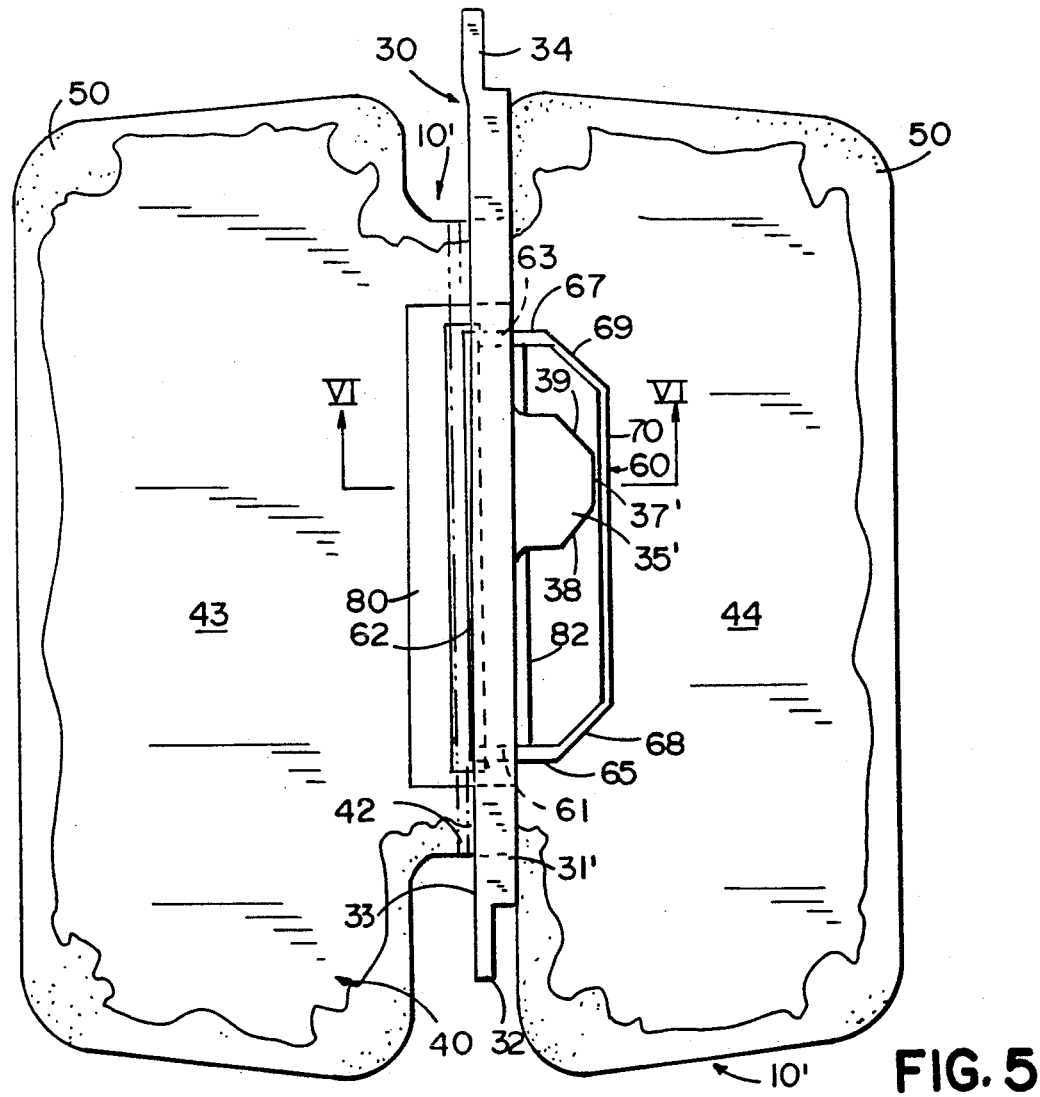
FIG. 5 is an enlarged front elevational view of a visor opened to expose an alternative embodiment of the present invention.

As best seen in FIG. 5, tab 35' associated with slide 30' is inclined with respect to the plane of the generally triangular elongated main body of the slide and provides a tip 37' which engages the wall 44 of core 40 for providing a frictional engagement force between the visor slide 30' and visor core 40 when enclosed. In addition, and in the preferred embodiment shown in FIG. 4, strips 80 and 82 of an upholstery fabric are glued to the core halves 43 and 44 immediately adjacent fold line 42 in the center area of the visor and span and compressively engage opposite sides 31' and 36' of slide 30' when the core sections 43 and 44 are folded over to an assembled position as illustrated in FIGS. 1 and 2 providing additional frictional engagement between the visor core 40 and slide 30' and preventing rattling of the slide with respect to guide 60. This provides a smooth longitudinal control for the visor to provide an improved feel to the visor as it is moved to its various adjusted positions between the limits shown in FIGS. 1 and 2 and prevents rattling of the visor during operation of a vehicle on uneven terrain. The outwardly inclined tip 37' of tab 35' also assists in providing an anti-rattle function and frictional control. In some embodiments of the invention only one of the frictional controls provided by inclined tab 35' or friction pads 80 or 82 may be used. In some other embodiments, both may be necessary or desirable. The embodiment shown in FIGS. 4 and 5 provides the maximum amount of anti-rattle and friction control for the slide and guide construction shown. By providing the triangular cross-section and tapered sides 38 and 39 to tab 35', and beveled walls 68 and 69 for the guide member 60, more compact packaging requiring less material is provided.

It will become apparent to those skilled in the art that various modifications to the preferred embodiments of the present invention as described herein can be made without departing from the spirit or scope of the invention as defined by the appended claims.

The embodiments of the invention in which an exclusive property or privilege is claimed are defined as follows:

1. A sliding visor for a vehicle, comprising:
    a slide having a generally thin cross-section, said slide including means at opposite ends for mounting said slide above a vehicle window; and
    a visor core including guide means for cooperatively and slideably coupling said visor core to said slide; and cooperating stop means on said slide and said guide means whereby said visor core is restricted to slide along said slide only within a prescribed length of travel; said cooperating stop means including a longitudinally extending main body portion and an outwardly extending tab extending laterally from said main body portion and provided to contact said guide means to restrict the sliding movement of said visor core.

2. The apparatus as defined in claim 1 wherein said visor core surrounds said slide and wherein said guide means comprises a generally rectangular frame with sidewalls having apertures for receiving said slide.

3. The apparatus as defined in claim 2 wherein said tab is generally inclined at an angle from said main portion of said slide toward said visor core.

4. The apparatus as defined in claim 3 wherein said main portion of said slide is generally triangular in cross-section.

5. The apparatus as defined in claim 1 and further including at least one pad secured to said core adjacent and in frictional contact with said slide to provide an anti-rattle support for said slide within said core.

6. The apparatus as defined in claim 5 wherein said slide includes an elongated main body portion and tab means extending laterally at an angle from said main body of slide for engaging said core.

7. The apparatus as defined in claim 6 wherein said visor core comprises a butterfly-shaped panel which is folded over said slide and contains said guide means therein.

8. The apparatus as defined in claim 7 wherein each half of said core panel includes a pad for engaging opposite sides of said slide.

9. A sliding visor for a vehicle, comprising:
    a generally rectilinear slide member having a generally triangular cross-section, said slide member having means for attachment above a vehicle window, said slide member including an elongated main body portion and an outwardly extending tab extending laterally from said main body portion;
    a butterfly-shaped visor core including a narrowed center area, said core folded over said slide member; and
    guide means mounted to said core and receiving said slide means, said tab limiting and controlling the sliding motion of said visor core on said slide member.

10. The apparatus as defined in claim 9 wherein said tab is inclined at an angle to the main body portion of said slide member so as to engage the inner side of said core.

11. The apparatus as defined in claim 10 wherein said tab has inclined sides and said guide means includes angled walls for engaging said inclined sides of said tab.

12. The apparatus as defined in claim 11 and further including pad means mounted to said core so as to engage said slide member for providing friction control for the movement of said core with respect to said slide member.

13. The apparatus as defined in claim 9 and further including pad means mounted to said core so as to engage said slide member for providing friction control for the movement of said core with respect to said slide member.

14. A sliding visor for a vehicle, comprising:
a generally rectilinear slide member for attachment above a window of a vehicle and having a thickness dimension substantially different than its height dimension;
a butterfly-shaped visor core with a rectangular guide means mounted thereto for cooperatively and slideably coupling said visor core to said slide member such that said visor core can slide along said slide member;
said slide member having at least a portion thereof exposed to said core through said guide means;
friction means between said exposed portion of said slide member and said core for providing a predetermined frictional force between said core and said slide member.

15. The apparatus as defined in claim 14 wherein said guide means limits the motion of said core along said slide member.

16. The apparatus as defined in claim 15 wherein said slide member includes an elongated main body portion and a tab extending laterally from said main body portion, and said guide means includes wall means engaging said tab to limit the motion of said core on said slide member at opposite ends of travel of the visor.

17. The apparatus as defined in claim 16 wherein said friction means is defined by said tab means extending at an angle inclined to the main body portion of said slide member and engaging said core.

18. The apparatus as defined in claim 17 wherein said friction means is further defined by pad means secured to said visor core for engaging said slide member.

19. The apparatus as defined in claim 14 wherein said slide includes an elongated main body portion and a tab means extending laterally therefrom and said friction means is defined by said tab means extending at an angle inclined to the body of said slide member and engaging said core.

20. The apparatus as defined in claim 14 wherein said friction means is defined by pad means secured to said visor core for engaging said exposed portion of said slide member.

* * * * *